L. C. WETZEL.
WEIGHING SCALE.
APPLICATION FILED JUNE 12, 1906.
1,030,362.
Patented June 25, 1912.
2 SHEETS—SHEET 2.
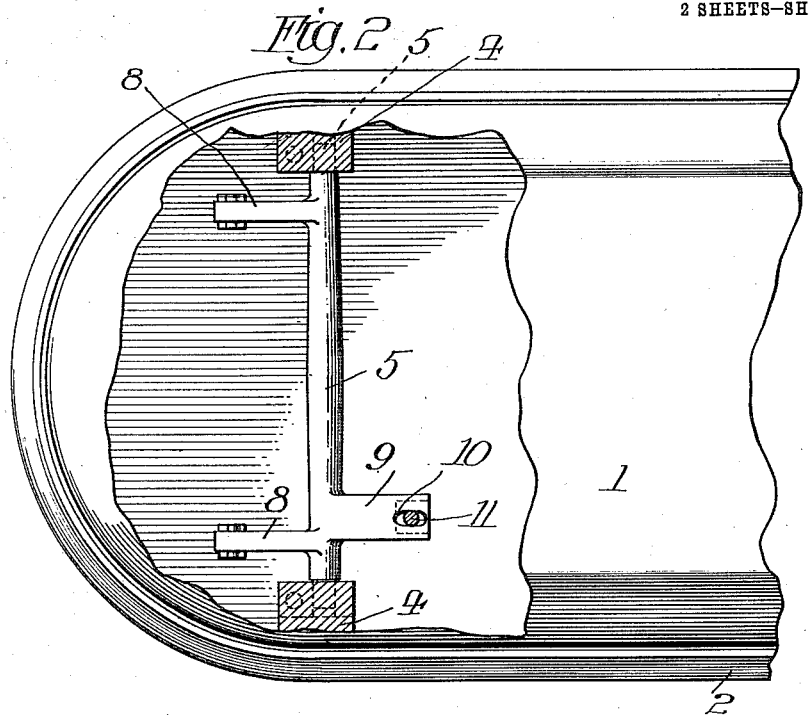
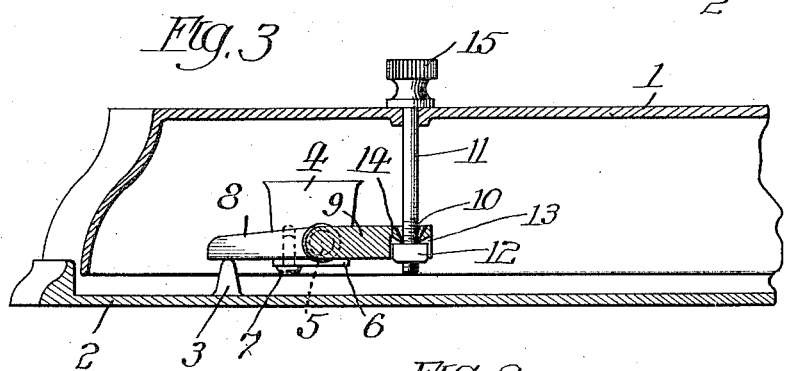
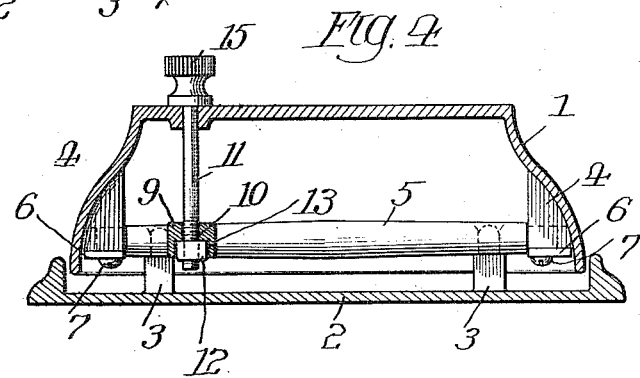

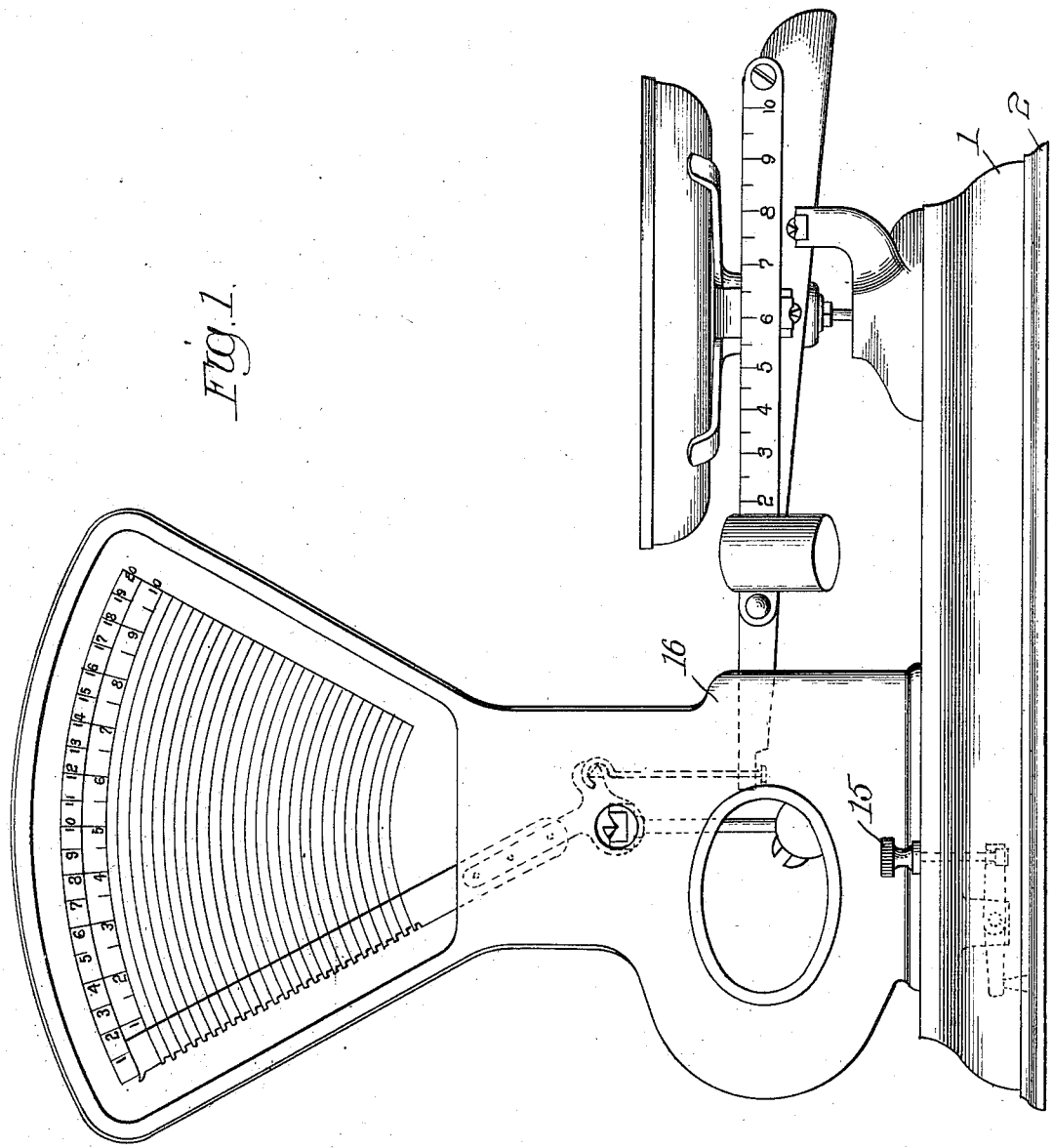

UNITED STATES PATENT OFFICE.

LEWIS C. WETZEL, OF TOLEDO, OHIO, ASSIGNOR TO THE TOLEDO COMPUTING SCALE COMPANY, OF TOLEDO, OHIO, A CORPORATION OF NEW JERSEY.

WEIGHING-SCALE.

1,030,362.  Specification of Letters Patent.  Patented June 25, 1912.

Application filed June 12, 1906. Serial No. 321,369.

*To all whom it may concern:*

Be it known that I, LEWIS C. WETZEL, a citizen of the United States, residing at Toledo, county of Lucas, and State of Ohio, have invented certain new and useful Improvements in Weighing-Scales, of which the following is a specification.

The present invention relates more particularly to devices for securing the proper adjustment of the base upon which the weighing apparatus is erected so as to keep the same level. It will be understood that in an apparatus of this kind it is essential to accuracy and uniformity of operation that the scales shall rest upon a level foundation. Various expedients have been resorted to in this connection and the present invention relates to certain improvements intended to facilitate manipulation of the adjusting devices and to prevent tilting or rocking when adjusted.

With the above stated and incidental objects in view the invention consists in certain novel features in construction and combination of parts the essential elements of which are recited in the appended claims and a preferred form of embodiment of which is described in detail hereinafter and fully illustrated in the accompanying drawings.

Figure 1 represents in front elevation computing weighing scales of a familiar type with the present invention embodied therein; Fig. 2 represents a portion of the base structure of such scales with a part broken out to disclose the interior construction; Fig. 3 represents this portion of the scales in longitudinal section; and Fig. 4 represents the same in cross section.

By preference the type of weighing scales to which the invention is shown applied in the present case is that disclosed in De Vilbiss Re-issue Patent No. 12,138, dated July 28, 1903, it being understood, however, that the invention is capable of application to and use with other types. For an understanding of the De Vilbiss computing weighing scales reference may be had to said re-issue patent and it will not be necessary to describe herein the details thereof.

It is customary in the manufacture of such scales to erect the weighing device upon a hollow base 1 which, in turn, rests upon a sub-base 2. By relative movement between these two parts of the base structure the proper level is attained for the weighing devices. It is usual for means to be employed whereby the base 1 may be raised or lowered at one end for this purpose. By the present invention it is proposed to improve the character of means for performing this operation. To this end the sub-base 2 is formed with upstanding internal lugs 3 spaced apart transversely of said sub-base. The base 1 is formed with bearings 4 on its inner sides which receive the journals of a rock shaft 5 confined in said bearings by caps 6 secured in place by screws 7. This rock shaft is formed with projecting arms 8 extending over the lugs 3 respectively, the latter being preferably brought to rounding edges so that said arms 8 may have a rocking bearing thereon. Another arm 9 projects in the opposite direction from said rock shaft and is formed with an orifice at 10 through which extends loosely a vertical bolt 11. The latter is threaded at its lower end and carries a nut 12 which occupies a recess 13 in the arm 9 under the orificed portion thereof. The upper wall of the recess has a conical formation, as shown at 14, so as to provide a rocking bearing for said nut 12. The bolt 11 extends through an orifice in the top of the base 1 and carries above the same a finger piece in the form of a thumb nut 15. The character of the adjusting means described provides for this thumb nut standing immediately in front of the housing 16 of the scales where it can be readily manipulated.

The turning of the thumb nut 15 in one direction will cause the nut 12 to rock the arm 14 and consequently press the arms 8 upon the lugs 3. In this manner the base 1 may be elevated at the end where the adjusting devices are located. The turning of the thumb nut in the opposite direction will of course permit this part of the base to lower. It will be seen therefore, that the devices described provide adjusting means whereby the base may be brought to the proper level. It will be noted that by providing the transversely spaced lugs on the sub-base and the transversely extending rock shaft with its correspondingly spaced arms engaging said lugs, any lateral tilting or rocking of the base 1 is prohibited.

Thus it will be seen that the objects primarily stated are effectively accomplished by the above described means. However, it is to be understood that the form of embodiment of the invention may be more or less modified as compared with that here shown and described.

What is claimed is:

1. The combination with base and sub-base, of means for relatively adjusting the same for the purpose of leveling the former, said means comprising a rocking member extending laterally of the base, abutments laterally spaced with relation to the base, and a finger piece for operating said rocking member.

2. The combination with base and sub-base, of means for relatively adjusting the same for the purpose of leveling the former, said means comprising a rocking member extending laterally of the base, abutments laterally spaced with relation to the base, and a single finger piece located at the front of the base for operating said rocking member.

3. The combination with base and sub-base, of means for relatively adjusting the same to level the former, said means comprising transversely or laterally spaced lugs on the sub-base, a rock shaft journaled in the base and having arms engaging said lugs respectively and an operating arm, and a finger piece connected with the latter.

4. The combination with base and sub-base, of means for relatively adjusting the same to level the former, said means comprising transversely or laterally spaced lugs on the sub-base, a rock shaft journaled in the base and having arms engaging said lugs respectively and an operating arm, and a finger piece connected with the latter and located at the front of the base.

5. The combination with base and sub-base, of means for relatively adjusting the same to level the former, said means comprising transversely or laterally spaced lugs on the sub-base, a rock shaft journaled in the base and having arms engaging said lugs respectively and an operating arm, and a bolt carrying a nut engaging the latter said bolt having a head outside the base.

6. The combination with base and sub-base, of means for relatively adjusting the same to level the former, said means comprising transversely or laterally spaced lugs on the sub-base, a rock shaft journaled in the base and having arms engaging said lugs respectively and an operating arm, and a bolt carrying a nut engaging the latter and having a head outside the base at the front part threreof.

7. A leveling device for apparatus of the character described, the same comprising, in combination with the base a rock shaft journaled in the latter and having bearing arms laterally spaced apart relative to the base and means for adjusting said shaft.

8. A leveling device for apparatus of the character described, the same comprising in combination with the base a rock shaft journaled in the latter and having bearing arms laterally spaced apart and adapted and arranged to engage a support, an operating arm, and adjusting devices applied thereto.

9. A leveling device for apparatus of the character described; the same comprising in combination with the base, a rock shaft journaled in the latter and having bearing arms laterally spaced apart relative to the base, and an operating arm; and an adjusting bolt and nut applied to said operating arm.

10. A leveling device for apparatus of the character described, the same comprising, in combination with the base, a rock shaft having a projecting arm for adjustably supporting the base, and means for adjusting the shaft.

11. A leveling device for apparatus of the character described, the same comprising, in combination with the base, a rock shaft having a projecting arm for adjustably supporting the base, and also having an operating arm; and means applied to the latter for adjusting the shaft.

12. In apparatus of the character described, the combination of a hollow base, a rock shaft journaled therein and having a projecting arm for adjustably supporting the base; and a finger piece on the exterior of the base adapted to adjust said shaft.

13. In apparatus of the character described, the combination of a hollow base, a rock shaft journaled therein and having a projecting arm for adjustably supporting the base, and also having an operating arm; and a finger piece on the exterior of the base and connected with said operating arm to adjust the said shaft.

14. In apparatus of the character described, the combination of a hollow base, a rock shaft journaled therein and having a projecting arm for adjustably supporting the base, and also having an orifice operating arm; a finger piece in the form of a bolt engaging the orifice of the operating arm and projecting to the exterior of the base; and a nut on said bolt engaging said operating arm.

LEWIS C. WETZEL.

Witnesses:
M. L. THOMPSON,
ALLEN DE VILBISS, Jr.